June 1, 1965   J. A. C. DE SENTMENAT   3,187,178
SUPPORTS FOR LIGHT DIFFUSER LAMINAS
Filed April 9, 1962   4 Sheets-Sheet 2
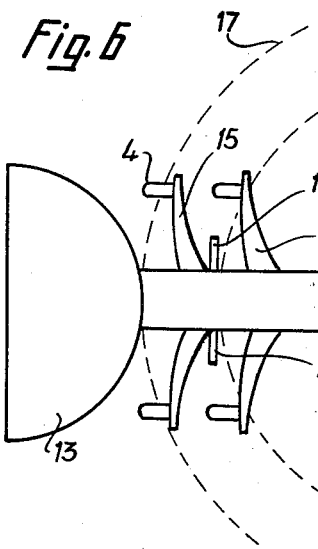
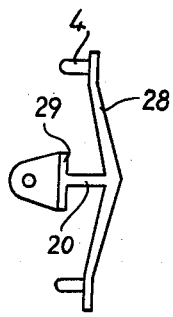
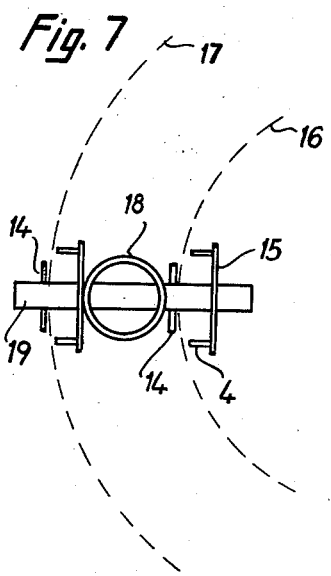
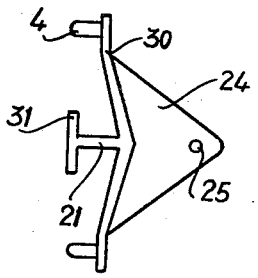
Jose Antonio Coderch de Sentmenat
INVENTOR.
BY Wenderoth, Lind
& Ponack, attorneys

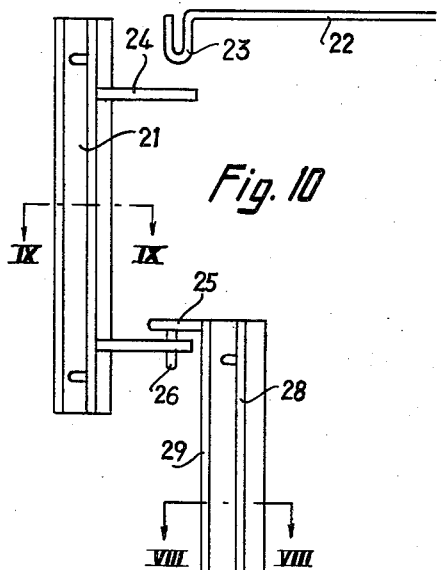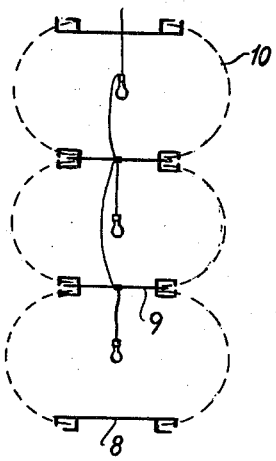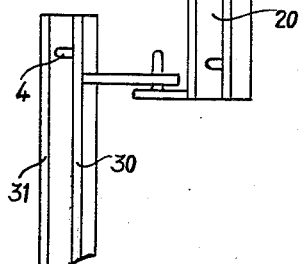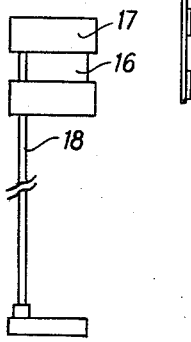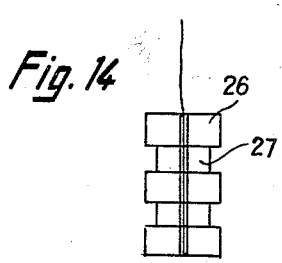

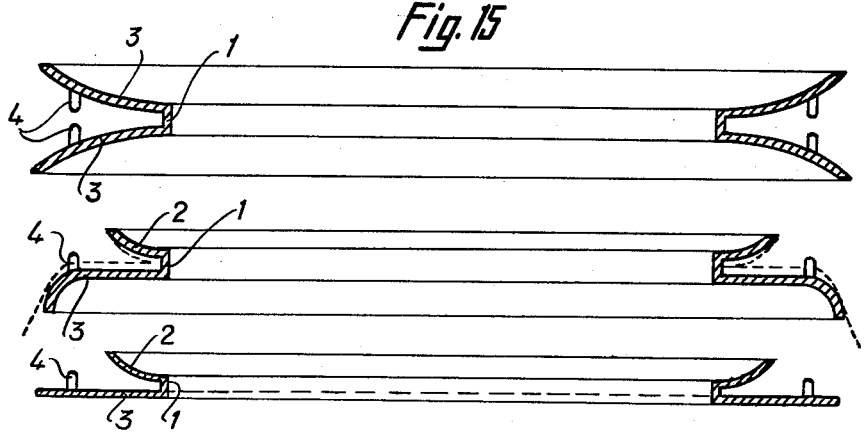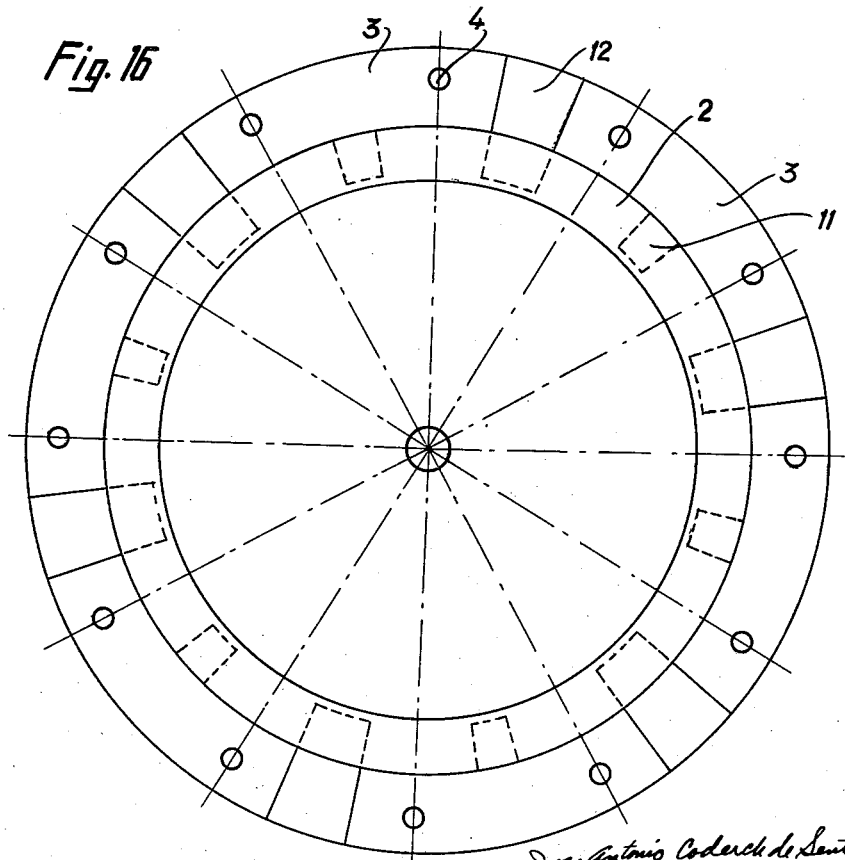

United States Patent Office 3,187,178
Patented June 1, 1965

3,187,178
SUPPORTS FOR LIGHT DIFFUSER LAMINAS
José Antonio Coderch de Sentmenat, 4 Plaza Calvo, Barcelona, Spain
Filed Apr. 9, 1962, Ser. No. 186,163
Claims priority, application Spain, Aug. 4, 1961, 269,568
7 Claims. (Cl. 240—108)

This invention refers to improvements in supports for light diffuser laminas.

These improvements are to be applied to the supports for diffuser laminas comprising the structure of the former which may be stamped, moulded or die pressed and provided with projecting pins for fixing the laminas thereto, which latter extend beyond the pins to butt against a geometrically normally disposed side wall, which abutment together with the coactive retention effected by the pin assure perfect alignment and fastening of the diffuser laminas to said supports.

These fixing elements, the pins and the side wall form part of the annular supports which may be stamped, laminated or moulded, a plurality of said pins being disposed normally to and around the outer border of at least one flange-like portion of the annular support, while the side wall is constituted by another flange-like portion of the same annular support.

The surrounding side wall with a brim directed outwardly serves as abutment for the laminas or lamina held by the pins arranged around the outer flange which is adequately inclined to assure a firm hold on one or more laminas.

When it is desired that the supporting ring hold two sets of laminas, the surrounding brim is situated midway between the extremities of the wider side wall.

One variation of the side wall abutment in the case of an end support comprises the formation of a brim from the outer border of the disc, the height of which brim over the base of the pins being equal to the thickness of the lamina or total number of laminas it is required to hold.

One very important characteristic of these rings is that they are held in their relative positions directly by the self-supporting diffuser laminas, the complete assembly forming the lamp shade.

In those cases where the retaining members are required for wall or floor lamps, provision is made for supporting them on a pedestal or direct on to a wall, in which latter case the vertical support may serve as the retaining side wall disposed normally to the laminas.

Provision has been made also for a suspended type of fitting in which the intermediate lamina supporting elements are placed back to back in order to accommodate diffusing laminas above and below in different planes vertically, the whole being suspended from a bridge piece incorporated in the top light diffuser lamina support.

In the drawings:

FIGURE 6 is a plan of a wall type lamp shade support.

FIGURE 7 is a plan of a floor pedestal lamp shade support.

FIGURE 8 is a section of one of the pieces of FIG. 10 through VIII—VIII.

FIGURE 9 is a section of one of the pieces of FIG. 10 through IX—IX.

FIGURE 10 shows the assembly of the pieces of a suspended type lamp.

FIGURE 11 shows schematically a lamp comprising the annular supports in the FIGURES 1 to 5 and 15 and 16.

FIGURE 12 shows a lamp obtained with the support shown in FIG. 6.

FIGURE 13 shows a lamp obtained with the support shown in FIG. 7.

FIGURE 14 shows a lamp obtained from pieces in FIGURES 8 to 10.

FIGURE 15 shows diametrical sections of different annular supports for diffuser laminas.

FIGURE 16 is the plan of an annular support.

With reference to FIGURES 1, 2, 4 and 15, it should be noticed that portions 1 are flanged at one edge 2 while the other edge has a wider flange 3 provided with pins 4 normal to the diametrical plane and directed towards the narrower or other flange.

Figure 1:
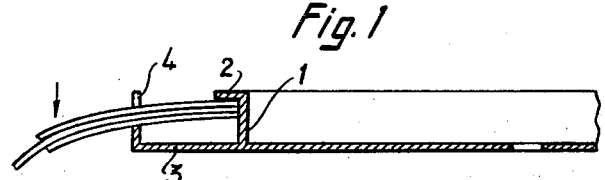
FIGURE 1 shows a diametrical section of an annular support.
Figure 2:
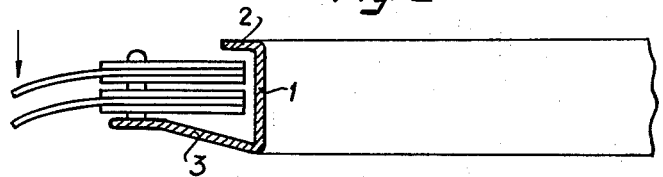
FIGURE 2 shows a diametrical section of another annular support.
Figure 3:
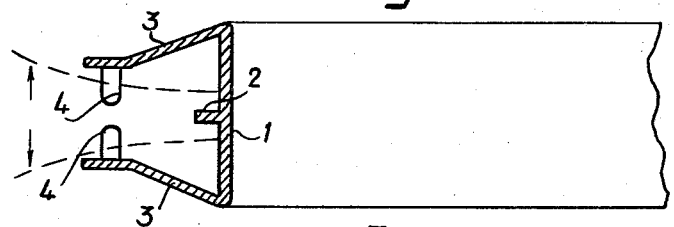
FIGURE 3 shows a diametrical section of a double annular support.
Figure 4:
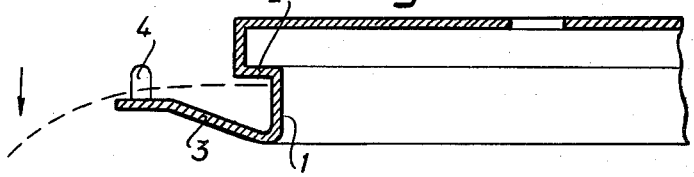
FIGURE 4 shows a diametrical section of an outer annular support.

In the case of double supports, FIGURES 3 and 15, the portion 1 comprises two opposing flanges 3 each provided with pins 4, while the flange 2 may or may not be included, and if so, will be at the centre of the portion 1.

Figure 5:
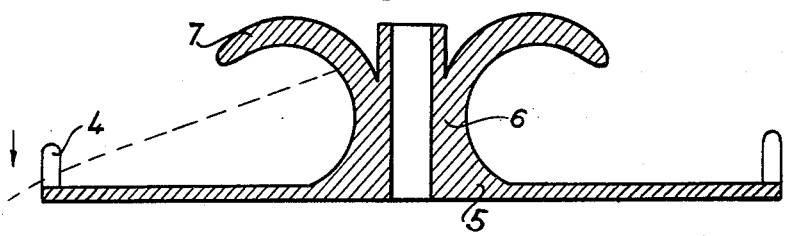
FIGURE 5 shows a diametrical section of an outer annular support.

In the case of FIGURE 5, a plate or disc 5 is provided with pins 4 at the extreme border, this disc having a central prolongation in the form of a tube 6 from which a curved hook-like form projects 7 in substitution of the flange 2, this tubular element being utilized for passing the conductor of electricity.

The situation of the diffuser laminas is shown in dotted lines in the drawings.

FIGURE 11 shows a lamp assembly obtainable from the aforementioned elements which are the outer annular supports 8, the intermediate double annular supports 9 and the diffuser laminas 10.

In the form of realization indicated in FIGURE 16, the flanges 2 and 3 are provided with thicker zones 11 and 12 respectively for perfect fitting of the diffuser laminas in two distinct planes.

In the case of FIGURES 6 and 12, the mounting of a lamp is shown on a wall support 13, in which the supports function directly as abutments, or cross pieces 14 for the same purpose in front of the flanges 15 carrying the pins 4, while the diffuser laminas are arranged in two planes 16 and 17.

In the case of the FIGURES 7 and 13, the cross piece 19 is seen to project from the support 18, on which cross piece may be seen the abutments 14 that collaborate with the flanges 15 in front of same which flanges carry the pins 4.

FIGURES 8, 10 and 14 show a realization of the suspended lamp formed from straight elements 20 and 21 hanging from an upper bridge piece 22 whose extremities are hook-formed 23 for this purpose; the elements 21 suspended from these hooks are provided with projecting pieces 24 with a hole 25 for this purpose, while the piece 20 is provided with a projection 25′ and pin 26 for hanging from the projecting piece 24 at the other extremity of the piece 21. As the piece 20 is provided with a similar projection 25′ at its other extremity, it is possible to hang elements 21 and 20 in chain-like form for any desired length of the lamp.

The diffuser laminas are arranged in two planes in this lamp, one 26 corresponding to pieces 21 and the other 27 corresponding to pieces 20.

The piece 20 is constructed with a longitudinal flange 28 provided with pins 4 with which latter the abutment 29 collaborates to obtain a perfectly aligned grip fitting. The flanges 28 are double to allow a firm gripping of two diffuser laminas in opposite directions between the two elements formed by the double flange.

Elements 21 are similarly provided with flanges 30, pins 4 and abutments 31.

I claim:

1. Means for securing a lighting diffuser system to a lamp comprising a disc shaped engagement member, a flange upon said engagement member extending radially outwardly of said disc shaped member, a backing flange spaced from said first mentioned flange also upon said member, spaced pins upon said first mentioned flange extending towards said backing flange and a diffuser shade having one end thereof fixed between said flanges engaging said pins.

2. Means for securing a lighting diffuser system to a lamp comprising a disc shape engagement member, a flange upon said engagement member extending radially outwardly of said disc shaped member, a backing flange centrally located upon said member spaced from said first mentioned flange also upon said member, spaced pins upon said first mentioned flange extending towards said backing flange and a diffuser shade having one end thereof fixed between said flanges engaging said pins.

3. Means for securing a lighting diffuser system to a lamp comprising a disc shaped engagement member, a flange upon said engagement member extending radially outwardly of said disc shaped member, a backing flange of shorter length than said first mentioned flange spaced from said first mentioned flange also upon said member, spaced pins upon said first mentioned flange extending towards said backing flange and a diffuser shade having one end thereof fixed between said flanges engaging said pins.

4. Means for securing a lighting diffuser system to a lamp comprising an engagement member for diffuser shades having a cross-section of T-shape, a diffuser shade, an abutment located spaced from the top of said T, the top of said T and said web forming spaced flanges for securing a diffuser shade thereto.

5. Means for securing a lighting diffuser system as set forth in claim 4 wherein pins are provided upon one of said flanges to engage said diffuser shades.

6. Means for securing a lighting diffuser system as set forth in claim 4 wherein said member has a different length so that the diffusing shades when mounted thereon will form a stepped contour.

7. Means for securing a lighting diffuser system as set forth in claim 4 wherein said engagement member has projections thereon provided with holes and other engagement members are provided with pins to seat in said holes.

References Cited by the Examiner

UNITED STATES PATENTS

| | | | |
|---|---|---|---|
| 1,039,226 | 9/12 | Vaughan | 248—223 |
| 1,339,491 | 5/20 | Axberg | 248—223 |
| 1,399,355 | 12/21 | Loveland et al. | 240—78 |
| 2,637,422 | 5/53 | Bell | 189—77 |
| 2,756,325 | 7/56 | Zwick | 240—78 |
| 2,927,993 | 3/60 | Lipscomb | 240—78 |
| 2,993,115 | 7/61 | Rosenblatt | 240—78 X |
| 3,092,877 | 6/63 | Perilstein | 20—56.4 |
| 3,094,286 | 6/63 | Harling | 240—103 X |

FOREIGN PATENTS

| | | |
|---|---|---|
| 308,625 | 3/29 | Great Britain. |

NORTON ANSHER, *Primary Examiner.*